May 29, 1956 L. B. GAMBY 2,747,396
SECURITY LOCK

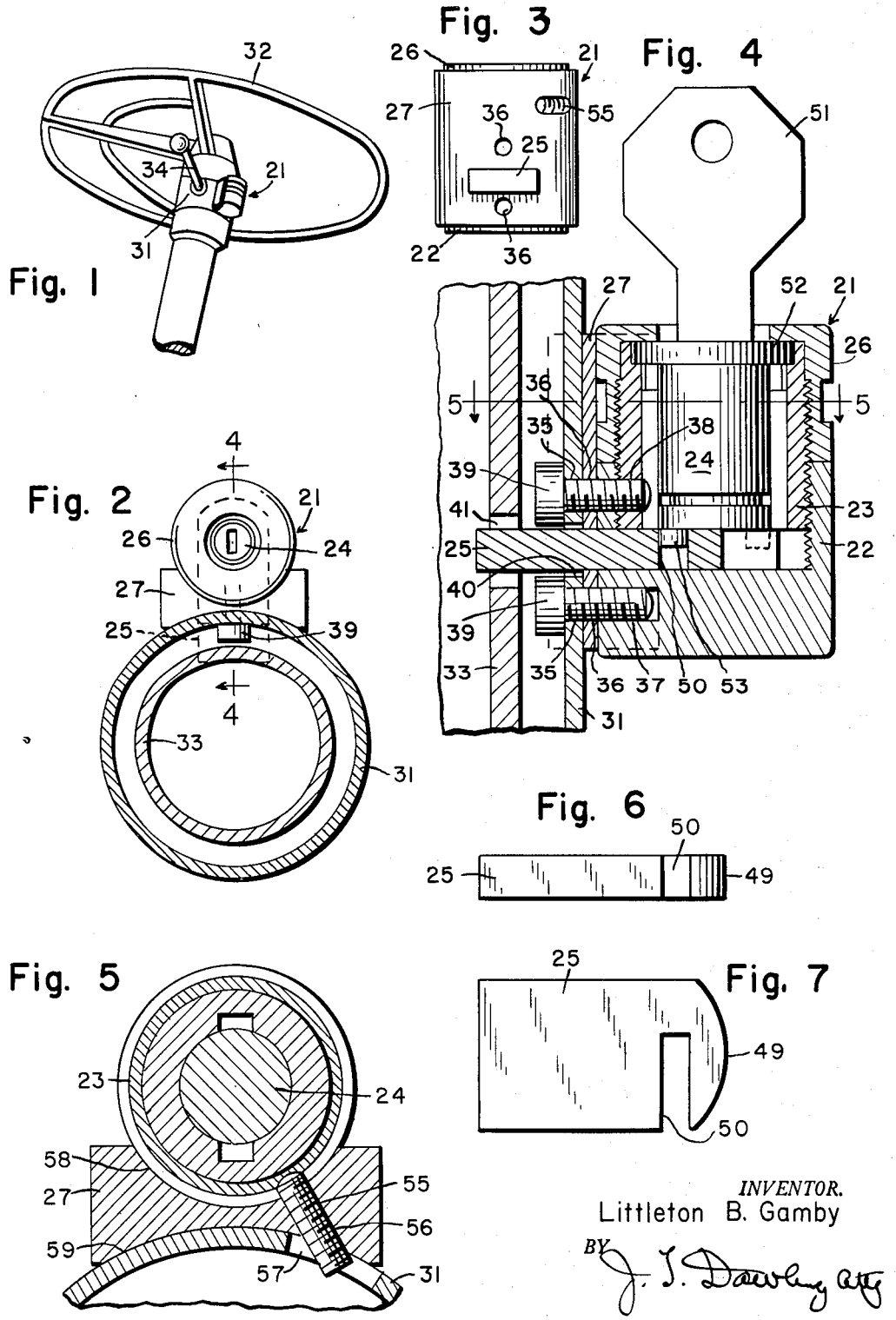

Filed June 15, 1954 2 Sheets-Sheet 2

INVENTOR.
Littleton B. Gamby
BY
J. T. Dowling
ATT

United States Patent Office 2,747,396
Patented May 29, 1956

2,747,396

SECURITY LOCK

Littleton B. Gamby, Baltimore, Md.

Application June 15, 1954, Serial No. 436,908

1 Claim. (Cl. 70—185)

This invention relates to locks and more particularly to locks of the type adapted to be mounted on the gear shaft housing or steering column of automobiles for the purpose of preventing unwanted operation thereof.

An object of the invention is to provide an improved lock device which is characterized by a high degree of accuracy, is simple in construction, is capable of being readily mounted on automobiles, and is dependable in operation.

Another object of the invention is to provide an improved lock of the above type, wherein a concealed locking element is adapted to engage the gear shifting shaft of an automobile in such a manner that rotation of said shaft is prevented.

With these and other objects in view, the invention consists in the construction and arrangement of the several parts which will be hereinafter more fully described and claimed.

To illustrate one particular mode of utilizing the features of the invention, the same will be described herein in detail in connection with the steering wheel or gear shifting housing of an automobile. However, it is to be understood that the invention is not limited to the specific construction and organization illustrated in the drawings, nor to the specific operation and use described herein for exemplification.

In the accompanying drawings,

Figure 1 is a perspective view showing the lock assembly device mounted on the gear shift housing of an automobile;

Figure 2 is an enlarged horizontal section of the gear shift housing shown in Figure 1, looking at the top of the lock assembly device, the lock tongue being shown in unlocked position;

Figure 3 is an elevation looking at the face of the lock assembly device which is disposed against the gear shift housing;

Figure 4 is an enlarged vertical sectional view taken on the line 4—4 of Figure 2, the lock tongue being shown in locked position;

Figure 5 is a detail horizontal section, taken along the line 5—5 of Figure 4;

Figures 6 and 7 are plan and side elevational views of the lock tongue removed from the lock;

Figure 17:
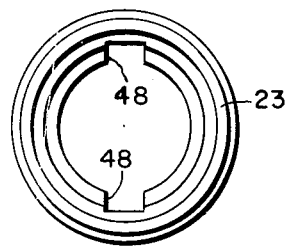
Figures 16 and 17 are side elevational and bottom plan views of the lock mechanism.
Figure 13:
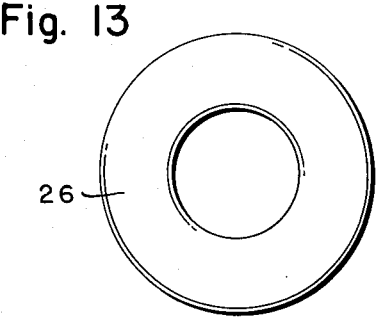
Figure 13 is a top plan view of the interior cylinder of Figure 8 assembled with the lock cylinder of Figure 11 and the lock tongue of Figure 7 mounted in retracted position therein.
Figure 14:
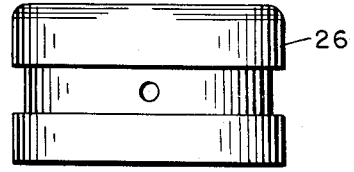
Figures 14 and 15 are top plan and side elevational views of the lock casing cap.
Figure 9:
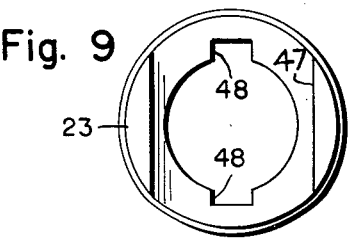
Figure 15:
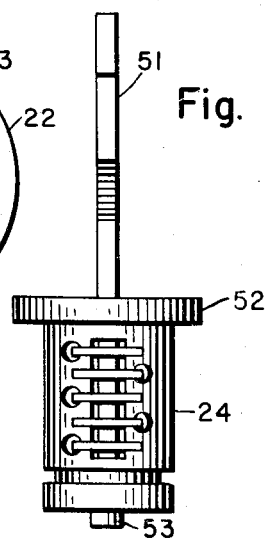
Figure 10:
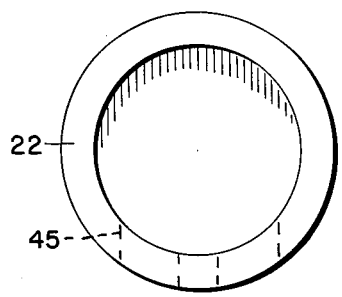
Figure 11:
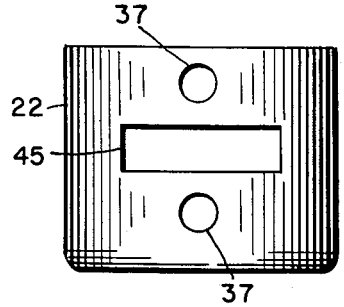

The improved automobile steering wheel lock 21 of the present invention comprises a casing 22 (Figures 10 and 11), a tubular insert in the form of a cylinder 23 (Figures 7, 8 and 9) mounted in said casing and extending upwardly therefrom a suitable distance, lock mechanism 24 (Figures 15 and 16) disposed within said cylinder, a lock tongue 25 (Figures 6 and 7) slidably mounted in the casing 22 and movable outwardly and inwardly with respect thereto by said lock mechanism, a lock casing cap 26 (Figures 13 and 14) mounted on said cylinder for retaining said lock mechanism therein, and a lock attaching block or bracket 27 (Figures 2, 3 and 5) adapted to be mounted on the gear shaft housing of an automobile and provide means for supporting the lock thereon. These several parts of the lock are constructed, assembled together, and operate in the manner to be hereinafter described.

As shown in Figures 1, 2, 3 and 4 of the drawings, the lock device 21 may be mounted on the upper portion of the steering shaft housing 31 of an automobile, directly beneath the steering wheel 32. Disposed within the housing 31 is the usual shaft 33 of the gear shifting mechanism which is operated by lever 34 in well known manner.

In order to mount the lock 21 on the housing 31, said housing has a pair of openings 35 formed therein. These openings 35 are in alignment with a pair of openings 36 formed in the bracket 27 and another pair of openings 37 formed in the casing 22. The upper set of aligned openings are also aligned with an opening 38 in the cylinder 23. Retaining screws 39 are mounted in the aligned openings in the manner shown best in Figure 4, said screws being inserted from the inside of the housing 31 and turned up to tightly fasten the lock in place on said housing.

The wall of the housing 31 between the openings 35 is formed with an opening 40 for the locking tongue 25, and shaft 33 is also formed with an opening 41 to receive the extended end of the locking tongue in the manner to be hereinafter described.

The casing 22 is closed at the bottom and open at the top and the side wall of said casing between the spaced apart openings 37, is formed with a rectangular opening 45. The lower edge of the opening 45 is in the same plane as the upper surface of the bottom of the casing so as to provide a smooth surface on which the locking tongue 25 slides during operation of the lock.

Figure 8:
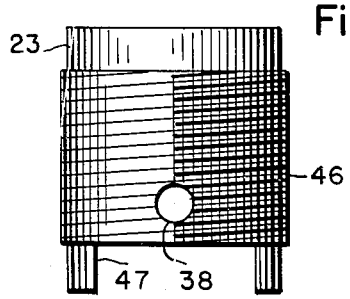
Figures 8, 9 and 10 are top plan, side elevational and bottom plan views of the interior cylinder of the lock.

The casing 22 is formed with internal screw threads to receive the screw threads 46 formed exteriorly on the cylinder 23, in the manner shown in Figure 8.

For a suitable distance downwardly from its top and for a suitable distance upwardly from its bottom, the cylinder is not provided with screw threads, and the lower plain end portion of the cylinder is formed with a slot 47 having a width corresponding substantially with the width of the locking tongue 25. The cylinder 23 is open at the both ends and when said cylinder is mounted within the casing 22, the slot 47 aligns with the rectangular opening 45. A pair of diametrically disposed grooves 48 are formed vertically in the internal wall of the cylinder in the manner shown in Figure 9.

The locking tongue 25 comprises a substantially rectangular body having an arcuate rear end 49 and a slot 50 formed transversely of said body adjacent to said arcuate end and extending inwardly a suitable distance from a longitudinal side edge, as shown in Figure 7.

Figure 12:
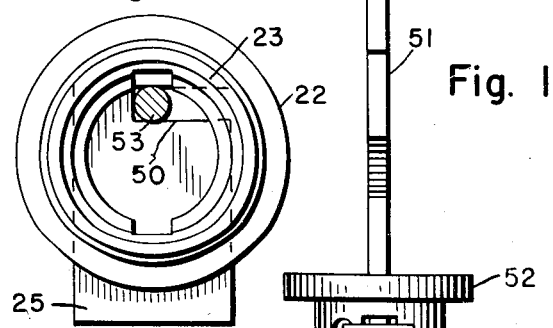
Figures 11 and 12 are top plan and side elevational views of the lock casing.

After the cylinder 23 has been mounted in the casing 22 with the slot 47 aligned with the opening 45, the locking tongue 25 is inserted arcuate end first into the casing until the slot 50 is disposed substantially in the position shown in Figure 12 at a distance remote from the opening 45.

The lock mechanism 24 may be of any well known standard type of lock mechanism rotatable through an angle of approximately 180 degrees by means of a key 51, insertable in and withdrawable from the lock at will. This mechanism is mounted within the cylinder 23 and retained therein by means of the cap 26 which is adapted to be screwed onto the upper threaded portion of the cylinder 23 in the manner shown in Figure 4. The cap 26 engages the upper flanged end 52 of the lock mechanism 24.

Figure 16:
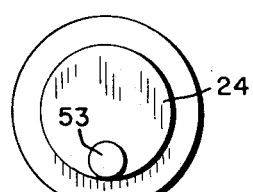

The bottom of the lock mechanism 24 has a lug 53 depending therefrom, said lug being eccentrically disposed with respect to the vertical axis of the lock mechanism, in the manner best shown in Figure 16. When the lock is unlocked the lug 53 is disposed in the position shown by dotted lines in Figure 4, and in full lines in Figure 12, in which position said lug is mounted within the slot 50. The locking tongue is in retracted position, as shown in Figure 12.

When the key 51 is turned through an angle of approximately 180 degrees from unlocked to locked position, the locking tongue 25 will be moved outwardly of the casing by the lug 53 and enter opening 41 in the shaft 33. With the locking tongue thus disposed in the opening 41, rotation of the shaft 33 will be prevented, as will be understood.

In order to prevent the cap 26 from being unscrewed and also in order to retain the assembled parts of the lock in position on the block or bracket 27, said bracket is provided with a screw threaded opening 55 for a set screw 56, which engages the cap 26 in the manner shown in Figure 5. Since the outer end of the set screw 56 may project outwardly beyond the portion of the block 27 which engages the exterior of the housing 31, said housing may have an opening 57 formed therein.

It will be understood that the block or bracket 27 has opposed arcuate surfaces 58 and 59, the surface 58 being curved to snugly fit the curved exterior surface of the lock casing 22 and cap 26, and the surface 59 being curved to snugly fit the curved exterior surface of the housing 31, as shown clearly in Figure 5.

Having thus described my invention, what I claim is:

A lock comprising in combination a housing having an internally threaded aperture extending inwardly from one end thereof to a point adjacent its opposite end, an externally threaded rotary lock mechanism carrying cylinder threadably receivable within said housing, an internally threaded cylinder retaining cap adapted to screw over the outer end of the cylinder and means for fixedly securing said cap to the housing, the housing extending beyond the inner end of the said aperture and having a slot extending outwardly through the housing at a ninety degree angle to the elongated axis of the housing and adjacent the inner end of the aperture, the inner end of the lock carrying cylinder having a recess formed in the cylinder walls of substantially the same dimensions as the opening in the housing, the recess extending across the inner end of the lock carrying cylinder, a locking tongue adapted to be slidably receivable within said slot in the housing and the recess adjacent the end of the cylinder, said tongue having a slot extending inwardly from one edge and adjacent one end thereof, a pin mounted on the inner end of the lock mechanism eccentrically to the elongated axis of the lock mechanism adapted to register with the said slot in the said tongue for moving the said tongue along the slots and beyond the said housing as the lock mechanism is rotated.

References Cited in the file of this patent

UNITED STATES PATENTS

| | | |
|---|---|---|
| 1,244,893 | Reed | Oct. 30, 1917 |
| 1,345,014 | Kendall | June 29, 1920 |
| 1,398,905 | Luplow | Nov. 29, 1921 |
| 1,556,818 | Hill et al. | Oct. 13, 1925 |